United States Patent [19]

Brown

[11] 4,338,198

[45] Jul. 6, 1982

[54] TWO STAGE FLUID BED REGENERATION OF SPENT CARBON

[75] Inventor: George N. Brown, Lexington, Va.

[73] Assignee: Westvaco Corporation, New York, N.Y.

[21] Appl. No.: 199,583

[22] Filed: Oct. 22, 1980

[51] Int. Cl.³ .................. B01J 20/34; B01D 53/08; C02F 1/28; C01B 31/10
[52] U.S. Cl. .................. 210/673; 34/10; 34/57 A; 55/60; 55/74; 201/31; 201/34; 202/121; 252/411 R; 252/420; 422/142; 422/144; 422/145; 432/15; 432/58
[58] Field of Search ............ 252/411 R, 417, 418, 252/420; 210/673; 34/10, 57 A; 201/31, 34

[56] References Cited

U.S. PATENT DOCUMENTS

| | | | |
|---|---|---|---|
| 1,893,363 | 1/1933 | Godel | 252/417 |
| 2,501,700 | 3/1950 | Stuart | 252/445 |
| 2,851,428 | 9/1958 | Wayne et al. | 252/417 |
| 2,933,454 | 4/1960 | Repik et al. | 252/419 |
| 2,966,447 | 12/1960 | Walter | 202/121 |
| 2,981,695 | 4/1961 | Peery | 252/417 |
| 3,043,752 | 7/1962 | Foch | 201/44 |
| 3,363,993 | 1/1968 | Campbell | 252/417 |
| 3,700,563 | 10/1972 | Karweil et al. | 252/411 R |
| 3,801,514 | 4/1974 | Joseph | 252/420 |
| 3,803,029 | 4/1974 | Blecharczyk | 210/16 |
| 3,816,338 | 6/1974 | Corson | 252/420 |
| 3,843,330 | 10/1974 | Conner et al. | 252/417 |
| 4,010,002 | 3/1977 | Degel et al. | 252/411 R |
| 4,017,422 | 4/1977 | Gappa et al. | 252/417 |
| 4,030,876 | 6/1977 | Akae et al. | 252/411 R |
| 4,033,726 | 7/1977 | Pulak | 23/288 |
| 4,058,374 | 11/1977 | Jüntgen et al. | 55/60 |
| 4,107,084 | 8/1978 | Repik et al. | 252/445 |
| 4,131,565 | 12/1978 | Komori et al. | 252/417 |
| 4,221,560 | 9/1980 | Idei et al. | 252/418 |
| 4,224,286 | 9/1980 | Murase et al. | 252/420 |
| 4,248,706 | 2/1981 | Repik | 252/420 |

FOREIGN PATENT DOCUMENTS

| | | | |
|---|---|---|---|
| 1006043 | 9/1964 | United Kingdom | 201/31 |
| 2017280 | 10/1979 | United Kingdom | 252/411 R |

*Primary Examiner*—P. E. Konopka
*Attorney, Agent, or Firm*—Terry B. McDaniel; Richard L. Schmalz

[57] ABSTRACT

Improved method and apparatus are disclosed for regenerating wet spent carbon containing volatile impurities wherein the wet spent carbon is dried in a drying zone utilizing incinerated reactivation zone gaseous effluent. The inmprovement of the invention provides that the portion of reactivation zone gaseous effluent used to dry the wet spent carbon in the drying zone is continuously recycled to the reactivation zone for incineration to remove any volatile impurities which may have been removed from the wet spent carbon during drying. The balance of the reactivation zone gaseous effluent may be discharged into the atmosphere without further incineration.

12 Claims, 3 Drawing Figures

TWO STAGE FLUID BED REGENERATION OF SPENT CARBON

BACKGROUND OF THE INVENTION (1) Field of the Invention

This invention relates generally to process and apparatus for regenerating wet spent carbon adsorbent. More particularly, the present invention is directed to a two stage procedure for regenerating wet spent carbon previously employed for purification of a liquid or gaseous stream.

(2) Description of the Prior Art

Carbon is well known for its properties of adsorption and/or absorption (commonly referred to as "sorption") and has long been used for the removal of contaminants from liquids and gases. In the area of decolorization and waste water treatment, carbon has found widespread utilization and efficacy.

Where the quantity of fluid being treated is relatively small, carbon is used until fully spent and then is discarded. On the other hand, in large scale industrial applications, the large quantities of carbon required mandates reuse of carbon for cost effectiveness purposes. Regeneration techniques involving solid sorbents, e.g., alumina, silica gel, molecular sieves and activated carbon have been developed and refined over the years.

The standard means of carbon regeneration process involves removal of water and adsorbate from the carbon to produce regenerated carbon, which can be reused. In removing the water and adsorbate from the carbon, the water is vaporized to moisture and the adsorbate is pyrolyzed to volatiles and fixed carbon. The fixed carbon is removed from the regenerated carbon by chemical reaction, normally with steam to form hydrogen and carbon monoxide. The regeneration off gas stream, which contains the organic volatiles, hydrogen, carbon monoxide, moisture, particulates, and other inorganic volatiles, is not normally suitable for emission to the environment. Normally the combustibles including the organics are combusted in an afterburner to carbon dioxide and water and the inorganics to the oxidized forms which are removed along with the particulates in a scrubber. The scrubber water must be treated accordingly and the clean gas is exhausted to the atmosphere.

In the fluid bed carbon regeneration process described in application Ser. No. 947,059, now allowed, by A. J. Repik, the external afterburner is eliminated and the heat is used within regeneration to improve the heat economy of the total regeneration process. In the Repik regeneration process the wet spent carbon is also dried, but the heat from incineration of the adsorbate is utilized in this case to drive the moisture from the carbon. In the second stage of a two stage process the adsorbate is volatilized and pyrolyzed, and the fixed carbon is reacted with steam to form hydrogen carbon monoxide and regenerated carbon. The term "fixed carbon" is intended to describe the residual carbonaceous product remaining on the carbon sorbent from the pyrolysis reaction of the adsorbed impurities.

Because of the efficiency of gas/solid contact in fluid beds, smaller reactors or less heat is required than in moving bed (multihearth or rotary) regenerators. In addition, the Repik regeneration process has improved economy over other fluid bed regenerators in that less fuel is required for regeneration because the adsorbate (volatiles, $H_2$, and CO) are combusted in the incinerator section above the regenerator bed. Heat is radiated and conducted from the incineration zone to the regenerator bed to reduce the amount of supplemental fuel needed for carbon regeneration. The incinerated gas is tempered as needed and used to dry the spent carbon in a fluid bed dryer. The off gas from the dryer contains the particulates and oxidized form of inorganics, which may be removed as necessary in a scrubber. The clean gas is exhausted to the atmosphere.

The drying of the spent carbon is normally carried out at temperatures which may result in steam stripping out of organics, depending on the adsorbate. If the adsorbate impurities which are volatilized in the dryer are not suitable for exhaustion to the atmosphere, then they must be removed from the gas stream. Many industrial situations would be expected to require an afterburner between the carbon regenerator and scrubber.

Although the Repik application teaches the incineration of off gases to liberate heat for heating the material being processed and the specific utilization of incinerated off gases for directly contacting wet, spent carbon prior to regeneration, there is no teaching of reincineration of the drying gases to completely remove volatile impurities which may have been added to the incineration zone gaseous effluent during drying the wet, spent carbon.

It is, therefore, an object of this invention to regenerate wet spent carbon sorbent, preferably obtained from a water purification system, in a manner such that activity of the carbon is not adversely affected by excessively elevated combustion temperatures at the loci of carbon treatment thereby enabling its subsequent reuse. Another object of this invention is to provide for recovery of heat values from the products of reactivation and to render the sorbed gases harmless prior to discharge to the atmosphere. A further object of the invention is to beneficially employ the recovered heat values from reactivation in a separate drying stage. Most importantly, the improvement of this invention allows this described recovered heat value's beneficial use to occur while maintaining the harmless nature of the sorbed gases, allowing their discharge to the atmosphere.

SUMMARY OF THE INVENTION

It has been discovered that the above-stated objects are attained, and a more effective regeneration process provided, by improving upon the two stage fluid bed regeneration method and apparatus of Repik by providing for recycling of the drying zone off gas, which may contain volatilized, non-emissionable adsorbate, through the incineration zone, thereby avoiding the necessity for passing these gases through an afterburner external to the regeneration unit and unnecessarily adding to the total energy requirements for the regeneration process.

DETAILED DESCRIPTION OF A PREFERRED EMBODIMENT

Generally, the process according to this invention comprises a two stage integrated process wherein combustion gas is utilized to reactivate a previously dried spent carbon adsorbent at pyrolysis conditions to release volatile impurities therefrom. The released volatile impurities are burned in a manner such that the heat of combustion generated is recovered and used for drying incoming wet spent carbon and for maintaining the pyrolysis conditions required for reactivation. Preferably, steam is also employed during reactivation in order to remove fixed carbon. In this manner, the reaction products, carbon monoxide and hydrogen, are burned together along with the volatile impurities.

Incoming wet spent carbon is first preheated in a fluidized drying zone which utilizes hot gases emanating from an incineration zone positioned therebelow, as will be described in greater detail hereinafter. Preferably, drying of the wet carbon is effected at conditions such that volatilization of the impurities in the carbon is minimized. While conditions are controlled to "minimize" discharge of volatile impurities from the wet spent carbon in the drying zone, it is rarely possible to avoid such discharge and, at the same time, effect complete drying of the carbon. The primary determinant in such discharge is the use to which the wet, spent carbon to be regenerated has been put. The process in which the carbon became spent will determine the amount and type of volatile impurities adsorbed thereon. Certain volatile impurities are more easily removed than others. If discharge of volatile impurities from the drying zone is not avoided or "minimized" to an efficient extent, the heretofore volatile impurity-free incineration zone gaseous effluent may become a volatile impurity laden drying zone off gas no longer suitable for discharge into the atmosphere without first passing through an afterburner. Therefore, the drying zone off gas is recycled by introducing it into the incineration zone where the adsorbate impurities are incinerated and the gaseous effluent is again passed to the drying zone.

Figure 2:
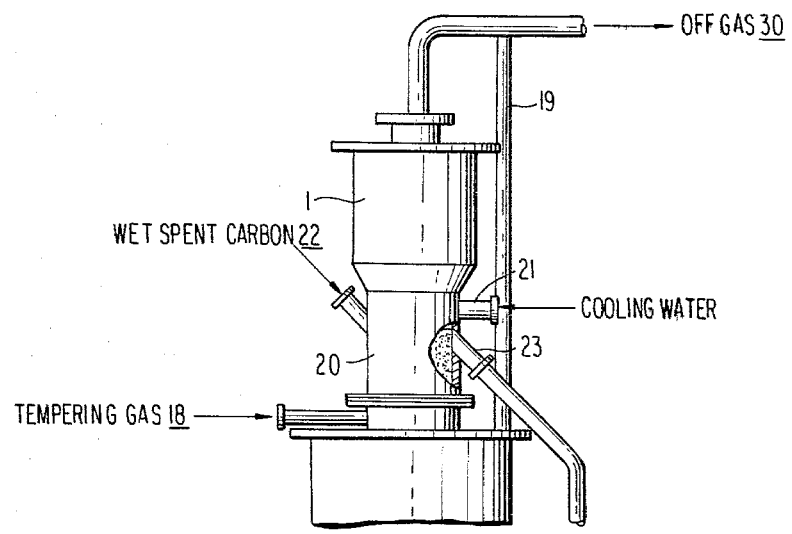
FIG. 2 illustrates the upper, or drying zone, portion of a vertically elongated vessel for regeneration of spent carbon sorbent showing the drying zone off gas to be combined with incineration zone gaseous effluent for discharge.
Figure 3:
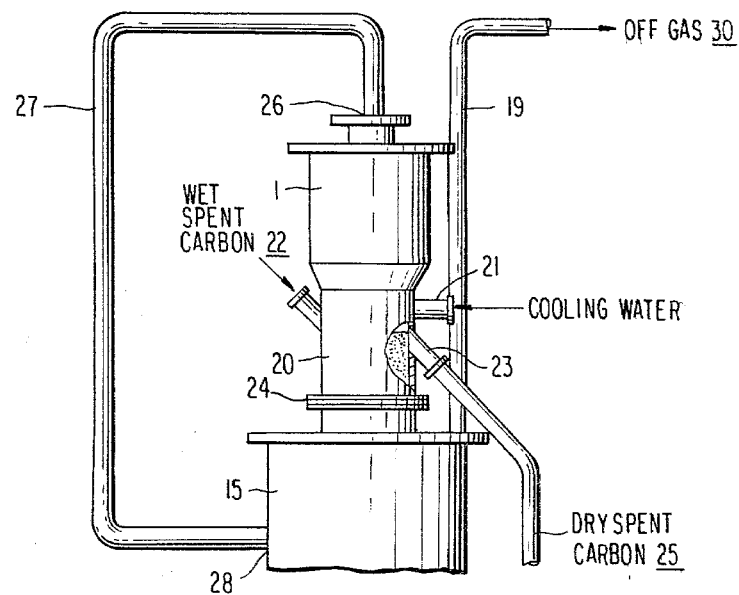
FIG. 3 depicts that portion of FIG. 1 which represents the improvement of the invention whereby provision is made for recycling the drying zone off gas to the incineration zone.

Comparison of FIGS. 2 and 3, shows this feature of the claimed invention (FIG. 3) to be quite distinguishable from the prior art method and apparatus (FIG. 2). The prior art apparatus of FIG. 2 depicts the drying zone off gas to be emitted with the incineration zone gaseous effluent; whereas, the invention apparatus of FIG. 3 provides for recycling the drying zone off gas to the incineration zone.

The dried sorbent containing volatile impurities is then passed to a reactivation zone, wherein reactivation takes place with combustion gas at pyrolysis conditions whereby the volatile components in the sorbent are released therefrom. Reactivated carbon and combustion gases containing the released volatile impurities are produced during reactivation. The reactivated carbon is recovered and the reactivation zone gases are passed to an incineration zone where they are burned to form an essentially volatile impurity-free incineration zone gaseous effluent. A portion of this incineration zone gaseous effluent is used to effect drying of the incoming wet spent carbon and then recycled to the incineration zone. The remainder of the incineration zone gaseous effluent is passed through a scrubbing operation to remove oxidized inorganics and discharged into the atmosphere.

The incineration zone is contiguous and in open communication with the reactivation zone and at least a portion of the heat required for reactivation is provided by radiation from the incineration zone. The incineration zone is intermediate to the drying zone and reactivation zone. Preferably, the incineration zone is superimposed over the reactivation zone. By this arrangement, combustion gas is formed below and is passed upwardly through the reactivation zone. The reactivation zone gaseous effluent is passed upwardly to the incineration zone. The incineration zone gaseous effluent, in turn, is passed upwardly both to the drying zone and to the atmosphere via a scrubber for removal of any oxidized inorganics.

Preferably, reactivation is effected with steam in addition to combustion gas.

The reactivation zone gaseous effluent generally contains carbon monoxide and hydrogen as well as combustible volatile impurities. To insure complete combustion, an oxygen-containing gas, such as air, is preferably introduced into the incineration zone where substantially complete combustion of the combustible reactivation zone gaseous effluent components with carbon dioxide and water occurs. Thus, noxious and undesirable gases are rendered harmless prior to discharge into the atmosphere. Where necessary to reach the combustion temperature, or, if required to maintain the required temperature within the drying and/or reactivation zones, fuel can be introduced into and burned within the incineration zone.

It is preferred that the dried spent sorbent is maintained in said reactivation zone in the form of a fluidized bed. It is also preferred that the wet spent sorbent is maintained in said drying zone in the form of a fluidized bed.

The drying zone is generally maintained at a temperature within the range of from about 225° F. to about 350° F. and most preferably at about 300° F. The temperature within said drying zone may conveniently be maintained within the required range by injection of cooling water.

The reactivation zone is maintained at a temperature of from about 1,000° F. to about 2,000° F., preferably within the range of from about 1,400° F. to about 1,800° F. and most preferably at about 1,600° F.

The incineration zone is maintained at a temperature range of about 1,500° F. to about 2,500° F., preferably within the range of from about 1,800° F. to about 2,000° F. and most preferably at about 2,000° F.

The apparatus aspects of this invention comprise a vertically elongated vessel where incoming wet spent carbon is reprocessed efficiently and where the sorbent impurities are converted to harmless gases in accordance with the method heretofore described.

Figure 1:
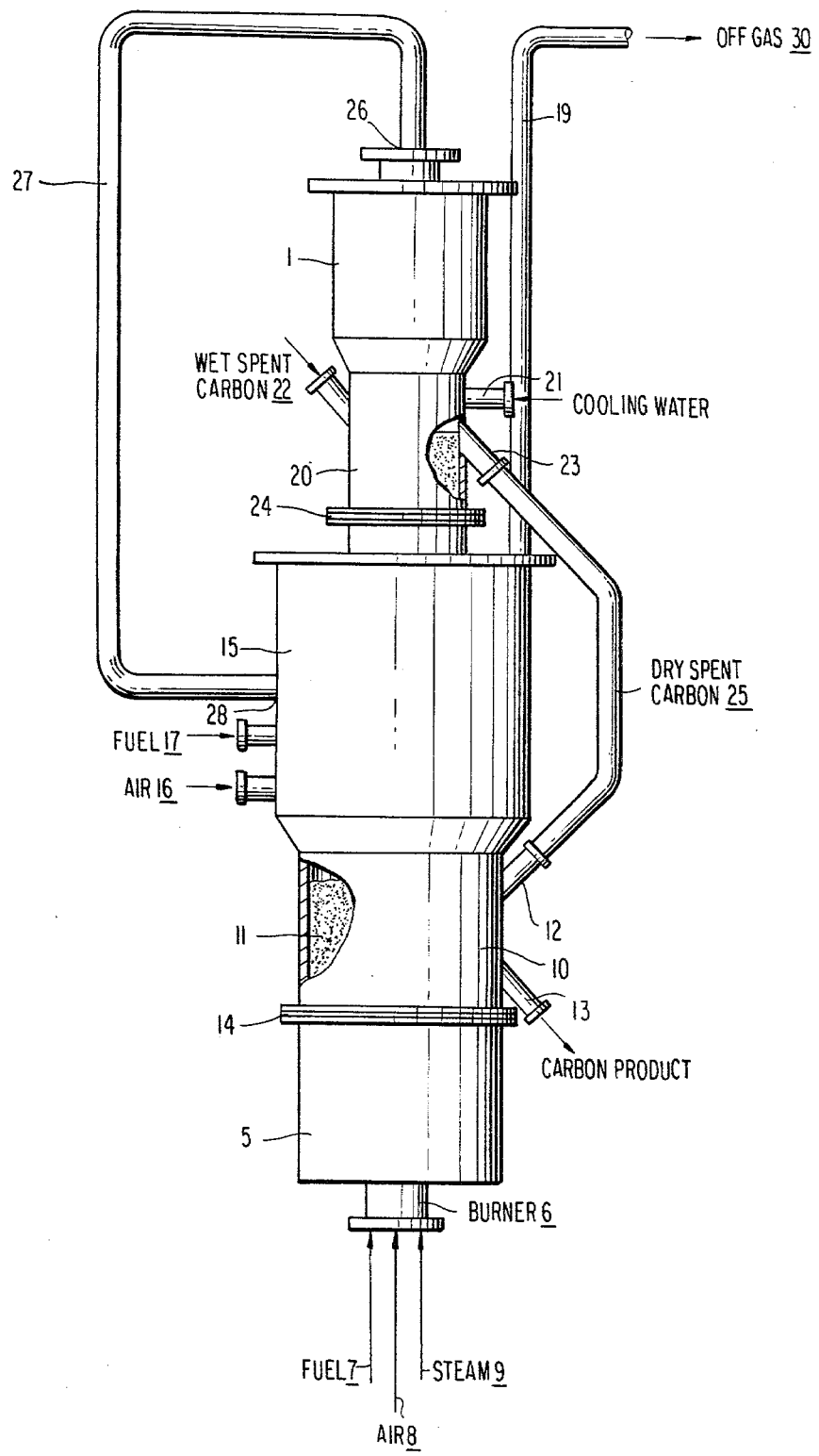
FIG. 1 illustrates a vertically elongated vessel for regeneration of spent carbon sorbent having portions of its wall cut away to show the carbon being treated therein.

Referring to FIG. 1, the vertically elongated vessel used for regeneration of wet spent carbon sorbent is indicated generally at 1. The vessel is comprised of a combustion chamber 5, regeneration zone 10, incineration zone 15 and drying zone 20. The terms regeneration and reactivation as used herein are synonomous and interchangeable. Burner 6 is associated with combustion chamber 5 wherein fuel, e.g., fuel oil or natural gas, and air are introduced through conduits 7, 8, respectively, mixed and combusted to produce combustion gases which are passed upwardly into regeneration zone 10. The combustion gases operate as the carbon fluidizing medium. Steam is also introduced via conduit 9 into the combustion chamber 5 and is passed upwardly into regeneration zone 10 intermixed with the combustion gas.

Regeneration zone 10 is superimposed over combustion zone 5 and separated therefrom by a perforated plate 14 which supports a fluidized bed of carbon particles 11 in the regeneration zone. Perforated plate 14 is of suitable conventional design for good gas distribution.

The predried spent carbon is introduced into the regeneration zone via inlet 12 and regenerated carbon is withdrawn via outlet 13. For regenerating the predried carbon, heated combustion gases are passed upwardly through regeneration zone 10 for both fluidizing the particulate carbon 11 and for removing volatile impurities contained in the carbon pores. Steam is passed upwardly into the fluidized carbon particles 11 and reacts with any residual pyrolysis products contained thereon, thereby forming carbon monoxide and hydrogen.

Regeneration zone 10 is maintained at conditions such that the volatile impurities are removed from the carbon by pyrolysis as compared to oxidation reactivation wherein the sorbed impurities are oxidized or combusted by utilizing controlled quantities of an oxygen-containing gas. Generally, a temperature of from about 1,400° F. to about 1,800° F. is maintained in the regeneration zone. A temperature of about 1,600° F. is preferred.

The requisite regeneration temperature is attained and maintained by heat imparted to the carbon particles by the combustion zone effluent and by heat radiated from the incineration zone 15.

Incineration zone 15 is superimposed over regeneration zone 10 and is in open communication and contiguous therewith. Air, or an equivalent oxygen-containing gas, may be introduced therein via conduit 16 to burn the combustible components in the gas issuing upward from fluidized carbon bed 11. During startup, or whenever necessary to maintain the desired incineration temperatures, fuel, e.g., natural gas, may also be introduced directly into the incineration zone via conduit 17. The excess of the total volume of incineration gas effluent over that required for drying may be withdrawn via gas by-pass conduit 19. Finally, to provide for re-incineration of incineration zone gaseous effluent passed through the drying zone to form drying zone off gas containing volatilized impurities from the wet spent carbon, inlet means 28 is provided for introducing drying zone off gas into incineration zone 15.

In the most preferred embodiment of this invention, conditions within incineration zone 15 are maintained to effect substantially complete combustion of gaseous effluent issuing from the regeneration zone comprised of volatile impurities and carbon monoxide and hydrogen produced by the reaction of steam and fixed carbon.

Another advantage provided by the improved process and apparatus of this invention over that described in Ser. No. 947,059 is that the use of a tempering gas to absorb excess heat from the incineration zone gaseous effluent entering the drying zone is precluded, as the effects of such excess heat (volatile impurities driven off the spent carbon in the drying zone) are accommodated by the drying zone off gas recycling. (See FIG. 2.)

By maintaining conditions within the incineration zone so as to effect substantially complete combustion of the aforementioned components, the economics of operation are enhanced and the off-gases emitted do not contain either the noxious volatile impurities or high levels of carbon monoxide. Accordingly, these gases may be released to the atmosphere without further incineration and its consequent expense. As heretofore noted, the method of this invention is specifically adapted for the regeneration of carbon sorbent where temperatures of the fluidizing gases are limited and injection and/or burning of a fuel within the fluidized regeneration zone is not desirable. This invention is also applicable to any fluidized bed process in which a temperature level must be maintained in the fluidized bed with temperature limits on the fluidizing gases and/or in cases where injection and burning of fuel in the fluid bed are not feasible.

It should also be noted that the injection of combustion air in the incineration zone above the fluidized bed has an added advantage. The turbulence above the bed is enhanced by the gases formed by the combustion of the regeneration zone effluent and improved mixing of the oxygen with the combustibles results.

Typically, spent carbon particles which are treated according to this invention contain about 5–25% volatile organic matter as a result of being used for water purification or the like. As the spent carbon is heated to about 1,400° F., the organic matter is desorbed from the carbon. The heating value of the spent carbon volatile matter ranges from about 7,500–15,000 BTU per pound with the lower values associated with drinking water treatment and the higher values typical of industrial applications. In addition to volatile matter from spent carbon, heating value is also derived from hydrogen ($H_2$) and carbon monoxide (CO) formed by the reaction of fixed carbon and steam during regeneration.

The improved process is demonstrated by the comparison of the heat efficiencies given in Table I. The drying zone off gas recycling and the ability of the described two stage fluid bed carbon regeneration process to accommodate the additional heat load lead to an estimated thermal savings of one half of that required by conventional means of afterburning the off gas from carbon regeneration.

TABLE I

COMPARISON OF FUEL REQUIREMENT ESTIMATES FOR DRYER OFF GAS INCINERATION INTERNALLY VERSUS AFTERBURNER*

| Two Stage Fluid Bed Activated Carbon Regeneration | Heat Input Requirements, BTU/Hr. |
|---|---|
| With Afterburner | 3,126,100 |
| With Internal Incineration of Dryer Off Gas | 1,616,000 |

*The calculation of these estimates assumes relatively low heating values of the adsorbate and takes no credit for heat provided by radiation from the incineration zone into the regeneration zone.

EXAMPLE I

As an example of the fuel usage provided by the improved process and apparatus of this invention, active carbon which has become spent and laden with adsorbate was regenerated during three consecutive 8-hour time periods to the approximate activity level of the virgin active carbon. The data is presented in Table II.

TABLE II

| Elapsed Time, Hrs. | Spent Carbon Feed Rate, Lb/Hr | Fuel Usage, Regen. BTU/Hr | Spent Carbon Volatile Content (Adsorbate) % | Spent Carbon Apparent Density LB/Ft$^3$ | Regenerated Carbon Properties Decolor. Index | Iodine Number | Apparent Density Lb/Ft.$^3$ |
|---|---|---|---|---|---|---|---|
| 8 | 580 | 778,400 | 14.8 | 36.9 | 10.2 | 1112 | 31.7 |
| 8 | 580 | 806,200 | 12.8 | 35.6 | 10.6 | 1092 | 31.4 |
| 8 | 580 | 806,200 | 17.0 | 36.6 | 11.4 | 1116 | 30.8 |
| Ave. for 24-Hr Run | 580 | 796,933 | 14.9 | 36.4 | 10.7 | 1107 | 31.3 |

The data shows that an average fuel usage of 796,933 BTU/Hr. (fuel oil) was required to effectively remove the adsorbate from the spent carbon (reducing the spent carbon's average apparent density of 36.4 Lb/Ft$^3$ to an average of 31.3 Lb/Ft$^3$ in the regenerated carbon) and restoring the carbon's activity to an average iodine number of 1107 and an average decolorizing index of 10.7. The fact that the real fuel usage was considerably below the estimated level may be a result of a higher than expected temperature in the incineration zone requiring less fuel to achieve the incineration temperature. Also, more radiation onto the regenerator bed possibly resulted in less fuel being required to achieve the same heat in combustion.

It should be appreciated that the present invention is not to be construed as being limited by the illustrative embodiments. It is possible to produce still other embodiments without departing from the inventive concepts herein disclosed. Such embodiments are within the ability of those skilled in the art.

What is claimed is:

1. In a method for regenerating wet spent carbon containing organic volatile impurities comprising the steps of
   (a) heating the wet spent carbon in a drying zone at a temperature wherein volatilization of the impurities in the carbon is minimized utilizing a hereinafter specified drying gas to form dried spent carbon containing volatile impurities,
   (b) passing the dried spent carbon to a reactivation zone,
   (c) contacting the dried spent carbon in the reactivation zone with combustion gases at pyrolysis conditions which liberate the volatile impurities therefrom, to produce reactivated dried spent carbon and reactivation zone gaseous effluent including liberated volatile impurities,
   (d) passing the reactivation zone gaseous effluent to an incineration zone, the incineration zone being contiguous and in open communication with the reactivation zone, and
   (e) burning the combustible components in the reactivation zone gaseous effluent in the incineration zone to form an incineration zone gaseous effluent, the incineration zone being intermediate between the drying zone and the reactivation zone, the improvement which comprises passing a first portion of the incineration zone gaseous effluent to the drying zone as the drying gas in step (a) producing a drying zone gaseous effluent containing a minimum amount of volatile impurities, the drying zone gaseous effluent being recycled to the incineration zone, and passing a second portion of the incineration zone gaseous effluent directly to a scrubber for removal of particulates and oxidized forms of inorganics prior to exhausting clean gas to the atmosphere.

2. The method of claim 1 wherein the incineration zone is superimposed over the reactivation zone, combustion gas is formed below and passed upwardly through the reactivation zone, reactivation zone gaseous effluent is passed upwardly to the incineration zone and the first portion of incineration zone gaseous effluent is passed upwardly to said drying zone and the second portion of incineration zone gaseous effluent is passed to the scrubber.

3. The method of claim 1 wherein reactivation is effected with steam in addition to combustion gases whereby carbon monoxide and hydrogen are formed in the reactivation zone, the carbon monoxide and hydrogen being burned in the incineration zone along with the liberated volatiles.

4. The method of claim 1 wherein the reactivation zone gaseous effluent contains carbon monoxide and hydrogen and an oxygen-containing gas is introduced into the incineration zone to effect combustion of gaseous effluent components to carbon dioxide and water.

5. The method of claim 4 wherein fuel is introduced into and burned within the incineration zone.

6. The method of claim 1 wherein the dried spent carbon is maintained in the reactivation zone in the form of a fluidized bed.

7. The method of claim 1 wherein the drying zone is maintained at a temperature within the range of from about 225° F. to about 350° F.

8. The method of claim 7 wherein the temperature within the drying zone is maintained within the required temperature range by injection therein of cooling water.

9. The method of claim 1 wherein the reactivation zone is maintained at a temperature of from about 1,400° F. to about 1,800° F.

10. The method of claim 1 wherein the incineration zone is maintained at a temperature range of from about 1,800° F. to about 2,000° F.

11. The method of claim 1 wherein the wet spent carbon is recovered from a liquid or gaseous stream, processed according to claim 1 and reused.

12. The method of claim 2 wherein at least a portion of the heat required for reactivation is provided by radiation from the incineration zone.

* * * * *